US010282898B1

(12) United States Patent
Kuntsevich et al.

(10) Patent No.: US 10,282,898 B1
(45) Date of Patent: May 7, 2019

(54) THREE-DIMENSIONAL SCENE RECONSTRUCTION

(71) Applicants: Ihar Kuntsevich, Orange Park, FL (US); Aliaksei Frydliand, Minsk (BY)

(72) Inventors: Ihar Kuntsevich, Orange Park, FL (US); Aliaksei Frydliand, Minsk (BY)

(*) Notice: Subject to any disclaimer, the term of this patent is extended or adjusted under 35 U.S.C. 154(b) by 0 days.

(21) Appl. No.: 15/837,225

(22) Filed: Dec. 11, 2017

Related U.S. Application Data

(60) Provisional application No. 62/462,486, filed on Feb. 23, 2017.

(51) Int. Cl.
*G06T 1/00* (2006.01)
*G06T 17/20* (2006.01)

(52) U.S. Cl.
CPC ............ *G06T 17/20* (2013.01); *G06T 1/0007* (2013.01); *G06T 2200/04* (2013.01); *G06T 2200/08* (2013.01); *G06T 2210/56* (2013.01)

(58) Field of Classification Search
None
See application file for complete search history.

(56) References Cited

U.S. PATENT DOCUMENTS

| 6,456,287 | B1 | 9/2002 | Kamen et al. |
| 6,466,205 | B2 | 10/2002 | Simpson et al. |
| 7,630,580 | B1 | 12/2009 | Repenning |
| 8,655,052 | B2 | 2/2014 | Spooner et al. |
| 8,699,787 | B2 | 4/2014 | van den Hengel et al. |
| 8,861,800 | B2 | 10/2014 | Savvides et al. |
| 2009/0144173 | A1 | 6/2009 | Mo et al. |
| 2013/0287294 | A1 | 10/2013 | Ye et al. |
| 2014/0316744 | A1* | 10/2014 | Katou ................. G06F 17/5018 702/189 |
| 2015/0254129 | A1* | 9/2015 | Authement ......... G06F 11/1048 714/704 |
| 2016/0140730 | A1* | 5/2016 | Falahatpisheh ..... G01S 15/8984 382/131 |

(Continued)

FOREIGN PATENT DOCUMENTS

WO  2006071006 A1  7/2006

OTHER PUBLICATIONS

"Autodesk 123D Catch—Generate 3D model from photos", webpage captured Sep. 9, 2016, URL: http://www.123dapp.com/catch.

(Continued)

*Primary Examiner* — YuJang Tswei
(74) *Attorney, Agent, or Firm* — H. John Rizvi; John Rizvi, P.A.

(57) ABSTRACT

Implementations are disclosed herein that relate to three-dimensional scene reconstruction. An example provides a computing device comprising a logic machine and a storage machine holding instructions executable by the logic machine to receive a two-dimensional dataset comprising two-dimensional image data of a physical scene, normalize the two-dimensional dataset, classify one or more objects in the two-dimensional dataset, reconstruct one or more depth values associated with the two-dimensional dataset, and construct a three-dimensional mesh of the physical scene based on the one or more classified objects and the one or more depth values. The instructions may be further executable to filter the three-dimensional mesh, and output the three-dimensional mesh.

17 Claims, 4 Drawing Sheets

(56) References Cited

U.S. PATENT DOCUMENTS

2016/0342861 A1\* 11/2016 Tuzel ................... G06K 9/6256
2017/0103161 A1\* 4/2017 Brubaker ................ G06F 19/16
2017/0193693 A1\* 7/2017 Robert ..................... G06T 7/55
2018/0139431 A1\* 5/2018 Simek .................. H04N 5/2258

OTHER PUBLICATIONS

"Capturing Reality", webpage captured Sep. 9, 2016, URL: https://www.capturingreality.com.
"North LP550 E-Safe Electrical Plug Lockout, Red", webpage captured Oct. 11, 2016, URL: https://www.google.com/shopping/product/5928760837837528010?q=safety+lock+on+plug&espv=2&biw=1024&bih=472&bav=on.2,or.r_cp.&bvm=bv.135258522,d . . . .

\* cited by examiner

THREE-DIMENSIONAL SCENE RECONSTRUCTION

CROSS-REFERENCE TO RELATED APPLICATION

This application claims the benefit of U.S. Provisional Patent Application Ser. No. 62/462,486, filed Feb. 23, 2017, which is incorporated herein in its entirety.

FIELD OF THE INVENTION

The present invention relates generally to generating three-dimensional data, and more particularly to reconstructing three-dimensional data from two-dimensional data.

BACKGROUND OF THE INVENTION

In many computing contexts, interaction with three-dimensional (3D) models and other 3D data is prominently featured. Video games, for example, feature 3D models rendered by a computing device for output to a display, and are configured for manipulation, control, or other types of user interaction. Other contexts feature 3D models that represent real, physical objects. For example, a 3D model may serve as a reference with which a corresponding physical object is manufactured, or may be used to simulate how a corresponding physical object behaves in real world applications.

A variety of approaches to generating 3D models exist. In many approaches, explicit user input from an artist, modeler, or the like is used to generate 3D models, and may involve the deliberate specification of various geometric parameters such as vertex positions. To this end, various software packages for facilitating the generation of 3D models exist, including computer-aided design and 3D modeling software. Other approaches rely less on explicit user input to generate 3D models, and leverage computational acceleration to automate 3D model generation from pertinent data. For example, a depth camera may be used to three-dimensionally image a physical scene and provide data with which the physical scene may be reconstructed on a computing device—e.g., as in photogrammetry.

The approaches to 3D model generation described above pose various drawbacks. User-driven approaches rely significantly on explicit user input to generate 3D models, whereas significant cost and operational complexity may be associated with the use of depth cameras. Further, many approaches to 3D model generation merely produce pseudo-3D output—for example, output that, while potentially exhibiting parallax, does not include 3D models that can be freely rotated and viewed in 360°. Still further, many approaches produce output that is static and/or lacks context regarding a reconstructed scene and the objects therein.

Accordingly, there is an established need for a system operable to generate fully 3D models and other 3D data with minimal user input that can be collected with conventional, low-cost imaging technology.

SUMMARY OF THE INVENTION

The present invention is directed to a system and method for constructing a 3D mesh from 2D image data.

In another aspect, a number of computing devices to which 3D reconstruction tasks are assigned is dynamically selected according to user demand.

In another aspect, processing of a 2D dataset includes classifying objects therein.

In another aspect, depth values are reconstructed for the 2D dataset by performing data fusion, evaluating 2D data overlap, and classifications.

In another aspect, a 3D mesh is reconstructed based on depth maps, classifications, and results of prior 3D reconstructions.

In another aspect, the 3D mesh is filtered for disconnected geometric components and unknown 3D objects.

In another aspect, the filtered 3D mesh is textured based on the 3D mesh and the 2D dataset.

In another configuration, disclosed is on a computing system, a method, comprising, receiving a two-dimensional dataset comprising two-dimensional image data of a physical scene, performing a three-dimensional reconstruction of the physical scene by, processing the two-dimensional dataset, reconstructing one or more depth values associated with the two-dimensional dataset, constructing a three-dimensional representation of the physical scene based at least on the one or more depth values, and outputting the three-dimensional representation.

In another aspect, performing the three-dimensional reconstruction of the physical scene includes: acquiring one or more parameters associated with an imaging device used to capture the two-dimensional dataset, and normalizing the two-dimensional dataset based on the one or more parameters associated with the imaging device.

In another aspect, performing the three-dimensional reconstruction of the physical scene includes selecting a number of computing devices of the computing system to perform the three-dimensional reconstruction based on the two-dimensional dataset.

In another aspect, performing the three-dimensional reconstruction of the physical scene includes selecting a set of computing resources of the computing system to perform the three-dimensional reconstruction based on a processing load of the computing system.

In another aspect, performing the three-dimensional reconstruction of the physical scene includes classifying at least one object in the two-dimensional dataset, and wherein the three-dimensional representation of the physical scene is constructed based on the at least one classified object.

In another aspect, the at least one object is a dynamic object having a variable state, and wherein the three-dimensional representation of the physical scene includes the dynamic object and encodes the variable state.

In another aspect, performing the three-dimensional reconstruction of the physical scene includes fusing each portion of the two-dimensional dataset that is of a threshold similarity into a respective group, and wherein the one or more depth values are reconstructed for each group as a whole.

In another aspect, performing the three-dimensional reconstruction of the physical scene includes filtering the three-dimensional representation of the physical scene by identifying and discarding one or more disconnected components of the three-dimensional representation.

In another aspect, the method further comprises generating one or more texture files that are spatially associated with the three-dimensional representation of the physical scene, wherein the one or more texture files are generated based on the two-dimensional dataset.

In another aspect, the three-dimensional representation of the physical scene is constructed based further on a result of a prior three-dimensional representation constructed by the computing system.

In another aspect, the result is stored in a data store communicatively coupled to the computing system, the data store further storing one or more unknown three-dimensional objects that failed to be classified.

A computing system is disclosed, comprising, one or more logic machines configured to, receive a two-dimensional dataset comprising two-dimensional image data of a physical scene, schedule a three-dimensional reconstruction of the physical scene to be executed by a number computing devices of the computing system, the number of computing devices selected based on the two-dimensional data set and on a processing load of the computing system, via the selected number of computing devices, process the two-dimensional dataset, reconstruct one or more depth values associated with the two-dimensional dataset, construct a three-dimensional mesh of the physical scene based at least on the one or more depth values, and output the three-dimensional mesh.

In another aspect, the one or more logic devices are further configured to vary the number of computing devices selected to execute the three-dimensional reconstruction of the physical scene as the processing load of the computing system changes.

In another aspect, the one or more logic devices are further configured to select a set of computing resources with which to execute the three-dimensional reconstruction of the physical scene, the selected set of computing resources including one or more of processor cores, functional units, threads, time slices, and memory ranges.

In another aspect, the system further comprises a data store storing a result of a prior three-dimensional reconstruction, and wherein the three-dimensional mesh of the physical scene is constructed based further on the result.

In another aspect, executing the three-dimensional reconstruction of the physical scene includes classifying at least one object in the two-dimensional dataset, and wherein the three-dimensional mesh of the physical scene is constructed based on the at least one classified object.

In another aspect, executing the three-dimensional reconstruction of the physical scene includes fusing each portion of the two-dimensional dataset that is of a threshold similarity into a respective group, and wherein the one or more depth values are reconstructed for each group as a whole.

In another aspect, executing the three-dimensional reconstruction of the physical scene includes filtering the three-dimensional representation of the physical scene by identifying and discarding one or more disconnected components of the three-dimensional representation.

A computing system is disclosed, comprising, one or more logic machines configured to, receive a two-dimensional dataset comprising two-dimensional image data of a physical scene, acquire one or more parameters associated with an imaging device used to capture the two-dimensional dataset, schedule a three-dimensional reconstruction of the physical scene to be executed by a set of computing resources of the computing system, the set of computing resources selected based on the two-dimensional data set and on a processing load of the computing system, via the selected set of computing resources, normalize the two-dimensional dataset based on the one or more parameters associated with the imaging device, classify at least one object in the two-dimensional dataset, reconstruct one or more depth values associated with the two-dimensional dataset, construct a three-dimensional mesh of the physical scene based on the one or more depth values and the at least one classified object, and output the three-dimensional mesh for display by a display device.

In another aspect, the at least one object is a dynamic object having a variable state, and wherein the three-dimensional mesh of the physical scene includes the dynamic object and encodes the variable state, executing the three-dimensional reconstruction of the physical scene includes fusing each portion of the two-dimensional dataset that is of a threshold similarity into a respective group, the one or more depth values are reconstructed for each group as a whole, executing the three-dimensional reconstruction of the physical scene includes filtering the three-dimensional mesh of the physical scene by identifying and discarding one or more disconnected components of the three-dimensional mesh, the one or more logic devices are further configured to, via the selected set of computing resources, generate one or more texture files that are spatially associated with the three-dimensional mesh of the physical scene, wherein the one or more texture files are generated based on the two-dimensional dataset, and the three-dimensional mesh of the physical scene is constructed based further on a result of a prior three-dimensional mesh constructed by the computing system.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a computing system that is configured to reconstruct 3D scene data from two-dimensional (2D) scene data. As described in further detail below, the computing system may be operable to receive a plurality of 2D images of a scene, and reconstruct a 3D model of the scene based on the plurality of 2D images.

Figure 1:
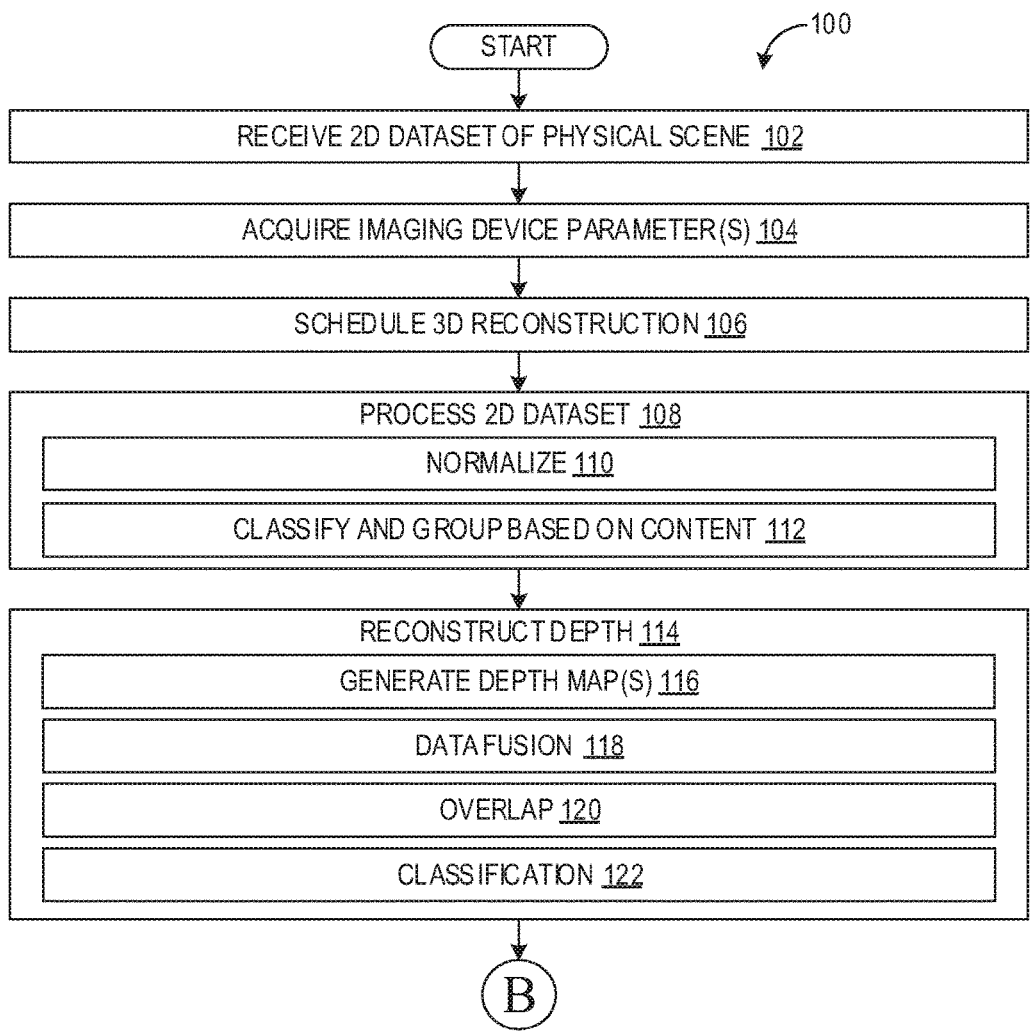
FIGS. 1 and 1A present a flowchart illustrating an exemplary method of reconstructing 3D scene data from 2D data.
Figure 1A:
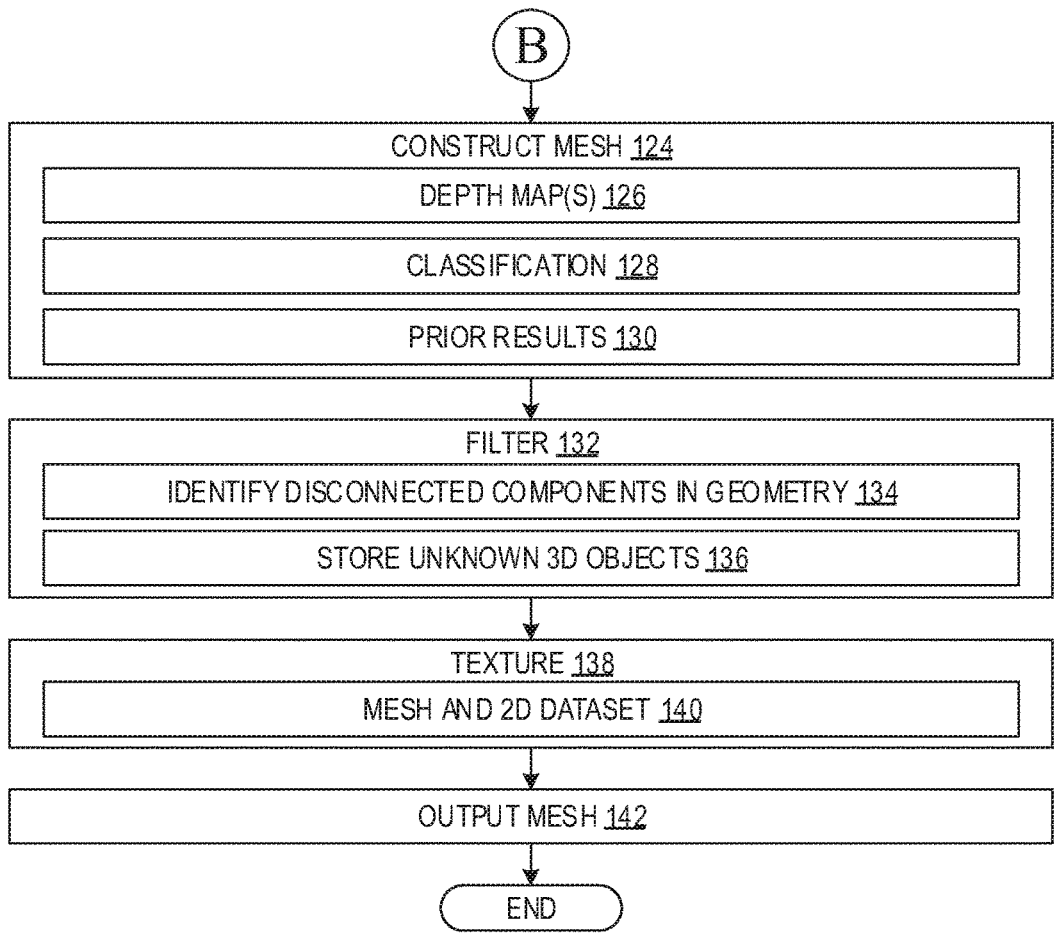

The illustration of FIG. 1 presents a flowchart illustrating a method 100 of reconstructing 3D scene data from 2D data. Method 100 may be executed on a computing system 200 shown in the illustration of FIG. 2, for example.

At 102, method 100 includes receiving, at a computing system, a 2D dataset of a physical scene from a user computing device. The physical scene may assume various forms, and may comprise one or more surfaces, discrete objects, continuous objects, and/or other real-world physical elements. The 2D dataset may comprise two or more, and in some examples a plurality of, 2D images. The 2D images may be captured with a 2D imaging device such as a camera. The 2D imaging device may exhibit optical sensitivity to any suitable wavelength ranges, such as color, UV, and/or infrared ranges. In some examples, the 2D imaging device may be a conventional color (e.g., RGB) camera. Further, the 2D images may assume any suitable form and arrangement. In some examples, the 2D images may be a temporally ordered sequence of images captured as a 2D video, though alternative temporal relationships are contemplated. Moreover, the 2D dataset may comprise data captured from a plurality of angles and/or distances relative to the physical scene. As the range of angles and/or distances through which 2D data of the physical scene is captured increases, a corresponding increase in the accuracy and quality of a 3D reconstruction of the physical scene generated by the computing system may result. As such, the computing system may accommodate natural variance in user capture of 2D data, and may leverage such variance to enhance 3D scene reconstruction.

At 104, method 100 includes acquiring, at the computing system, one or more parameters associated with the imaging device with which the 2D dataset is captured. The imaging device parameter(s) may be acquired from the user computing device or directly from the imaging device, for example. Generally, the imaging device parameter(s) may comprise typical camera parameter(s). As examples, the imaging device parameter(s) may comprise one or more internal parameters, such as focal length, shutter speed, exposure time, aperture, white balance, lens parameter(s), and/or focus mode. The imaging device parameters(s) alternatively or additionally may comprise one or more external imaging device parameters, such as a relative position and/or orientation of the imaging device (e.g., relative to Earth and/or to a specific geographic location such as the physical scene imaged). A relative position and/or orientation of the imaging device may be provided via sensor(s) (e.g., an inertial measurement unit) embedded in the imaging device or operatively coupled thereto, for example. For implementations in which the 2D dataset comprises two or more images, one or more of the imaging device parameter(s) may be specified for each image. In such implementations, acquisition of the imaging device parameter(s) may include extracting the parameter(s) from exchangeable image file format (EXIF) data, which may be specified for each image.

At 106, method 100 includes scheduling a 3D reconstruction of the physical scene. In some implementations, the computing system may comprise a plurality of computing devices to which a variable number can be assigned 3D reconstruction tasks according to processing load. In other words, the computing system may scale the number of computing devices assigned to 3D reconstruction, and as such may be referred to as a "scalable" computing system. Thus, scheduling the 3D reconstruction at 106 may include scaling, and/or generally selecting, the amount of computing resources assigned to the 3D reconstruction. In one example, the computing system may scale the number of computing devices according to the computational demand imposed by each user requesting 3D reconstruction from the computing system in a load-balancing-type approach. Thus, the computing system may perform scaling according to the processing load (e.g., processor load, memory load, bandwidth load) imposed on the computing devices/overall computing system, the 2D dataset associated with a request for 3D reconstruction, and/or any other suitable factors. Scaling may be linear or in some cases sublinear as a function of the volume of received 2D datasets, depending on image content therein, for example. Further, while scaling may include respectively increasing or decreasing assigned computing devices in response to increasing or decreasing processing demand, scaling may be configured in other manners. For example, various levels of granularity are contemplated, such that sets of computing devices (e.g., two or more) are selectively assigned and unassigned tasks. As another example, per-device resources may be selectively assigned and unassigned tasks as stipulated by the computing system or computing device to which they belong, including but not limited to processor cores, functional units, threads, time slices, and/or memory ranges. Similarly, various levels of granularity in assigning reconstruction tasks are contemplated. For example, substantially the entirety of a 3D reconstruction pipeline (e.g., as implemented by method 100) may be assigned to each discrete computational unit (e.g., computing device, computing device set, computational resource). In other examples, portions of a 3D reconstruction pipeline may be assigned to each discrete computational unit—e.g., for a given 2D dataset, a first computing device may be assigned to processing the 2D dataset, while a second computing device may be assigned to constructing a mesh. Such assignment may vary depending on whether portions of the 3D reconstruction pipeline are sequential (i.e., one portion depends on the result of another portion) or whether different portions can be executed simultaneously (i.e., one portion does not depend on the result of another portion).

By dynamically scaling the computing resources allocated to 3D reconstruction as described above, the computational and power efficiency of the computing system can be maximized while leveraging potential parallelism of the computing system to deliver 3D reconstructions to users with high accuracy and expediency. Scaling may further enable the computing system to accommodate a wide range of demand imposed by user requests for 3D reconstruction—e.g., the computing system may provide high performance for virtually any number of 2D images for which 3D reconstruction is requested. As such, 3D reconstruction may be implemented in a cost-effective manner. Details regarding an exemplary distributed, cloud-based implementation of the computing system are described below with reference to the illustration of FIG. 2.

At 108, method 100 includes processing the 2D dataset. Processing the 2D dataset may include, at 110, normalizing at least a portion of the 2D dataset. Various types of normalization are contemplated, which may vary with the content of the 2D dataset and/or the imaging device parameter(s) received at 104. For example, geometric normalization may be performed on one or more 2D images, which may include the application of various transformations (e.g., skewing, rotating, resizing). As another example, at least a portion of the image content in the 2D dataset may be normalized—e.g., to account for differing white balances and/or exposure times. Further, processing the 2D dataset may include, at 112, classifying and grouping data in the 2D dataset based on content. To this end, the computing system may provide the 2D dataset as input to one or more classifiers (e.g., trained according to known machine learning approaches), which may then classify various aspects of the 2D dataset and group recognized class(es). Classifier(s) may assume any suitable form, including but not limited to linear classifiers, support vector machines, kernel estimators, neural networks, and decision trees. In some examples, the computing system may perform object classification, which may include determining an object class or identity for one or more objects. Classified objects and their classified attributes may be associated with the 2D dataset from which they were derived, for example via association with memory locations, pixel locations, etc. Further, in some examples dynamic objects may be classified in addition to static objects. Dynamic objects may be objects that change state over time in some manner. As an example, an object that is physically configured to rotate about a fixed point may be recognized as a dynamic object. As described in further detail below, dynamic aspects of a dynamic object may be reconstructed in reconstructing a 3D scene including the dynamic object. In the preceding example, a 3D model of a scene including the rotatable object may encode the rotational nature of the rotatable object such that the object can be rotated in appropriate contexts (e.g., a 3D model viewer).

In some examples, the computing system may employ a hierarchical approach to classification. Various classifications may be organized into various hierarchical levels, and classes identified at a hierarchically lower level may lead to attempts to identify classes at a hierarchically higher level. As one example, an initial hierarchical level may include classes such as a line, edge, compositions, and other primitive geometry. A second hierarchical level above the initial level may include classes such as squares, rectangles, polygons, and minimal grouped primitives. A third hierarchical level above the second level may include classes such as semantic geometric objects and groups thereof. A hierarchical level n levels above the third level, where n is any suitable integer, may include classes such as composite geometry extracted from user-provided data (e.g., the 2D dataset) encoded as a linear combination of classes in lower hierarchical levels, either as groups or subcomposites. The computing system may store classes in a local or remote data store, which may be updated with new classes as they are recognized.

At 114, method 100 includes reconstructing one or more depth values associated with the 2D dataset. The depth values may generally represent the distance (e.g., Cartesian z-coordinate) from the imaging device with which the 2D dataset was captured to various locations on the surface of the imaged scene. As indicated at 116, depth value reconstruction may include generating one or more depth maps. For example in which the 2D dataset comprises an image set, a depth map may be generated for each image in the set. The depth map(s) may assume various suitable forms, and in some examples a depth map may include a depth value for each pixel—e.g., a depth value may be determined for each corresponding pixel in each 2D image. As another example, a depth map may assume the form of a point cloud. Further, as indicated at 118, depth value reconstruction may include data fusion. As part of data fusion, at least a portion of the 2D dataset determined to be of a threshold similarity may be fused into one or more dataset groups to increase the quality of depth value reconstruction. Two or more 2D images, for example, determined to be of the threshold similarity may be fused into one or image groups. For a given fused group, depth value reconstruction may be performed on the group as a whole and not on its constituent datasets—e.g., depth values may be reconstructed for a single fused image and not the two or more constituent images that were combined to produce the fused image. As indicated at 120, depth value reconstruction may consider overlap (e.g., spatial and/or temporal) among portions of the 2D dataset. In one example, every possible overlap in a set of 2D images may be considered, and the overlap that produced the most desired result (e.g., most confident depth value(s)) may be selected. Further, as indicated at 122, depth value reconstruction may consider the output of classification performed at 112. In particular, object classifications may be used to assign depth values such that a determined class of a given object is used to inform the assignment of depth values to the given object. In some examples, the output of the depth value reconstruction performed at 14 may include a substantially contiguous depth map or other data structure including depth values that are registered to corresponding x/y or scene locations, such that depth values can be obtained for substantially the majority of the imaged scene, as permitted by constraints of the imaging device such as resolution.

At 124, method 100 includes constructing a 3D mesh of the scene imaged by the 2D dataset. As indicated at 126, mesh construction may utilize the depth map(s) generated at 116. As an example, the depth (e.g., z-coordinate) of one or more points (e.g., vertices) in the mesh may be derived from corresponding point(s) in the depth map(s). Further, the x/y or scene locations may be combined with depth values to produce a 3D mesh comprising a plurality of 3D points, each of which in some examples may have a unique 3D position. As indicated at 128, mesh construction may utilize the results of classification and/or grouping performed at 112. More specifically, object classes may be used to adjust the geometry of the mesh. Mesh construction alternatively or additionally may employ triangulation to determine one or more 3D points in the mesh. Further, as indicated at 130, the results of prior mesh construction(s) may be used to inform the current mesh construction. For example, the computing system may adapt the geometry of the mesh by searching for similar patterns among the current mesh and prior meshes. To this end, the computing system may include, or may remotely and communicatively couple to, a data store holding data associated with prior mesh construction(s).

At 132, method 100 includes filtering the mesh constructed at 124. Mesh filtration may include, at 134, identifying disconnected components. Geometry of the mesh may be searched through to identify disconnected component(s), which may be identified as disconnected based on various criteria—e.g., floating geometry and/or logically inconsistent geometry may be considered disconnected. In some examples, disconnected components may be deemphasized or discarded from the mesh, which may simplify the geometry of the mesh, and in turn reduce the volume of data representing the mesh. Further, mesh filtration may include, at 136, storing unknown 3D objects. The unknown 3D objects may comprise 3D objects that failed to be classified at 122 and/or disconnected components, for example. The computing system may store the unknown 3D objects in a local or remote data store, for example by adding the 3D objects to a database as a set of connected nodes, which may comprise known and unknown 3D objects.

At 138, method 100 includes texturing. Texturing may include generating texture file(s) separate from the filtered mesh, in which case the texture file(s) and filtered mesh may be provided as separate outputs from method 100. Alternatively, the texture file(s), once generated, may be applied to the mesh such that a textured, filtered mesh is provided as output from method 100. In either case, the texture file(s) may be spatially associated with the mesh so as to enable the accurate application of the texture file(s) to the mesh and the output of an accurate, textured mesh that is representative of the reconstructed physical scene. As indicated at 140, texturing may be based on the filtered mesh generated at 132 and at least a portion of the 2D dataset received at 102. Textures may be derived from image content (e.g., RGB image content) in the 2D dataset, for example, with proper consideration of the spatial correspondence of texture data to mesh locations being made.

At 142, method 100 includes outputting the 3D mesh. As described above, the output of the 3D mesh may include a textured 3D mesh or an untextured 3D mesh, which may be accompanied by texture file(s). When provided separately, the texture file(s) can be applied to the untextured 3D mesh with any suitable software. The 3D mesh may be output in any suitable format. In some examples, the 3D mesh may be output in one or more file formats that are standardized or recognized in the field of 3D data processing. The 3D mesh may assume various suitable forms, including but not limited to a 3D point cloud and an assembly of one or more geometric primitives (e.g., triangles). These and other possible forms are generally referred to herein as "3D representations" of the reconstructed physical scene. The 3D mesh, texture file(s), and/or other suitable outputs of the reconstruction pipeline implemented by method 100 may be provided for output by any suitable output device(s), such as a display device, two or three-dimensional printing device, etc.

As alluded to above, the computing system may store results from various components of the 3D reconstruction pipeline implemented by method 100 in a local or remote data store. These results may be used to inform subsequent 3D reconstructions and thereby increase the accuracy and robustness of 3D reconstruction over time in a self-learning approach. Further, the supply of user-related data (e.g., 2D datasets) may enable self-learning, enabling such increases in accuracy and robustness via the simple reception of user-related data without requiring human guidance of learning. As examples, the computing system may store one or more of the following that may be derived from 3D reconstructions and stored to inform subsequent reconstructions: 2D image data, imaging device parameters, 3D reconstruction scheduling data, normalization data, object classes, object groups, depth maps, point clouds, 2D image data overlap, filtration data, disconnected geometric components, unknown 3D objects, textures, unfiltered meshes, and filtered meshes. Further, learning models, data, algorithms, and other aspects relating to the 3D reconstruction pipeline implemented by method 100 may be configured for various levels of granularity. In some examples, respective recognition algorithms may be used for different object classes, patterns, etc., which may enable the computing system to remain adaptive to high variance in scene and image content.

In view of the above, the 3D reconstruction pipeline implemented by method 100 may afford various advantages in providing 3D reconstruction. For example, supply of a 2D dataset associated with a user request for 3D reconstruction may be sufficient to enable the 3D reconstruction without requiring additional user input. Further, method 100 may provide fully 3D meshes that are fully viewable in 360° and can be edited via suitable software. Moreover, method 100 may provide 3D meshes with dynamic objects than can be interacted with or altered in some way. In the example described above in which a rotating element is recognized in a physical scene, method 100 may produce a 3D reconstruction of the scene including the rotating element while preserving its rotating capability—e.g., by encoding the element such that it can be rotated in suitable software. Still further, the approaches to scheduling a 3D reconstruction described herein enables a computing system performing the 3D reconstruction to dynamically adapt to user demand in scalable fashion and to leverage parallelism of the computing system.

Figure 2:
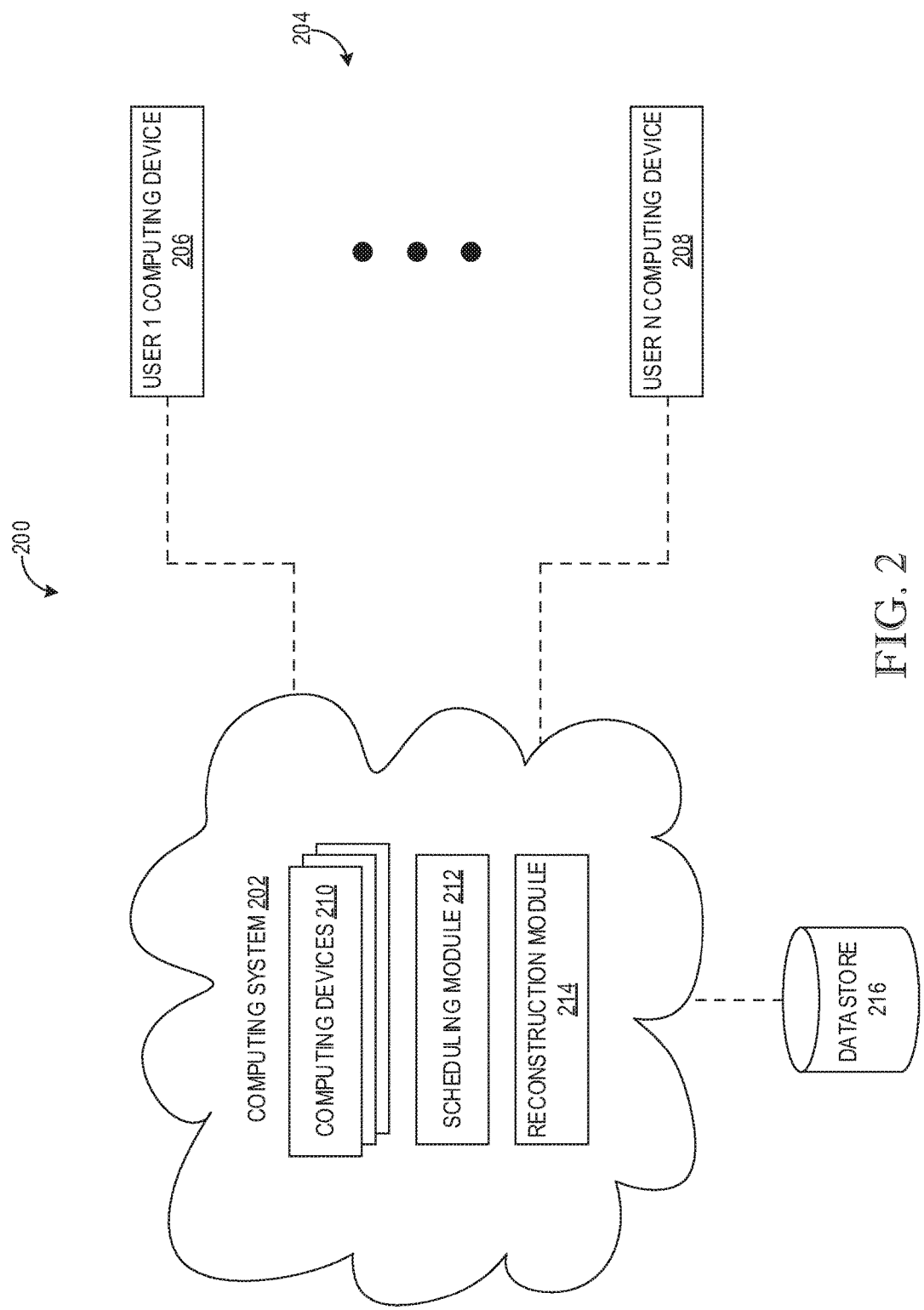
FIG. 2 presents an exemplary system that may be used to perform the method of FIG. 1.

The illustration of FIG. 2 presents a system 200 that may be used to perform method 100 of the illustration of FIG. 1. System 200 includes a computing system 202 that is generally configured to service requests from a plurality of users 204 for 3D reconstructions of physical scenes imaged in 2D image datasets. As shown, the plurality of users 204 includes n users each associated with a respective computing device, though one or more of the users may interact with computing system 202 with two or more computing devices. A computing device 206 associated with a first user, for example, is communicatively coupled to computing system 202, and a computing device 208 associated with an nth user is communicatively coupled to the computing system. Computing devices 206 and 208 may be operable to upload 2D image datasets (e.g., 2D image files) to computing system 202 and to request 3D reconstruction of the scenes imaged therein. To this end, computing devices 206 and 208 may issue 3D reconstruction requests and upload 2D data via a suitable mechanism, such as via an application and/or web interface.

Computing system 202 includes a plurality of computing devices 210, which may be selectively assigned various tasks relating to a 3D reconstruction pipeline (e.g., as implemented by method 100 of the illustration of FIG. 1). To this end, each of the plurality of computing devices 210 includes a logic machine and a storage machine holding instructions executable by the logic machine to effect the approaches described herein. For example, one or more of the plurality of computing devices 210 may execute instructions stored in a scheduling module 212 and/or a reconstruction module 214.

Scheduling module 212 may comprise instructions executable to dynamically assign various portions of the 3D reconstruction pipeline to selected numbers or sets of the plurality of computing devices 210 and/or to computing resources therein (e.g., processor cores, threads, time slices, memory locations). Scheduling module 212 may be configured such that a greater portion of the plurality of computing devices 210 and computing resources therein are assigned 3D reconstruction tasks in response to greater levels of demand imposed by user requests for 3D reconstruction, and such that a lesser portion of the plurality of computing devices and computing resources therein are assigned 3D reconstruction tasks in response to lesser levels of demand imposed by user requests for 3D reconstruction. Generally, scheduling module 212 may enable dynamic scaling of computing device assignment in response to user-imposed load. The plurality of computing devices 210 may be communicatively coupled to an orchestrator (e.g., one or more computing devices) performing scheduling via a suitable network such as a cloud network.

Reconstruction module 214 may comprise instructions executable to effect one or more of the following processes: reception of 2D datasets, acquisition of imaging device parameters, processing of 2D datasets, normalization, classification, grouping, depth value reconstruction, depth map generation, mesh construction, point cloud construction, mesh filtration, data storage, learning, texture, and output of 3D meshes.

System 200 further includes a data store 216 communicatively coupled to computing system 202, which may be implemented across one or more storage devices and may be hosted locally to, or remote from, the computing system. Data store 216 may hold data relating to the results of various 3D reconstruction tasks, which may be retrieved to inform subsequent 3D reconstructions and increase the accuracy and robustness of reconstruction in a self-learning approach as described above. As examples, data store 216 may store one or more of the following: 2D image data, imaging device parameters, 3D reconstruction scheduling data, normalization data, object classes, object groups, depth maps, point clouds, 2D image data overlap, filtration data, disconnected geometric components, unknown 3D objects, textures, unfiltered meshes, and filtered meshes.

The approaches described herein may be implemented on a computing system. The computing system may be configured to implement such approaches by executing machine-readable code, for example in the form of a micro operation set, assembly instruction set, software application, library, service, program, or other suitable format.

Figure 3:
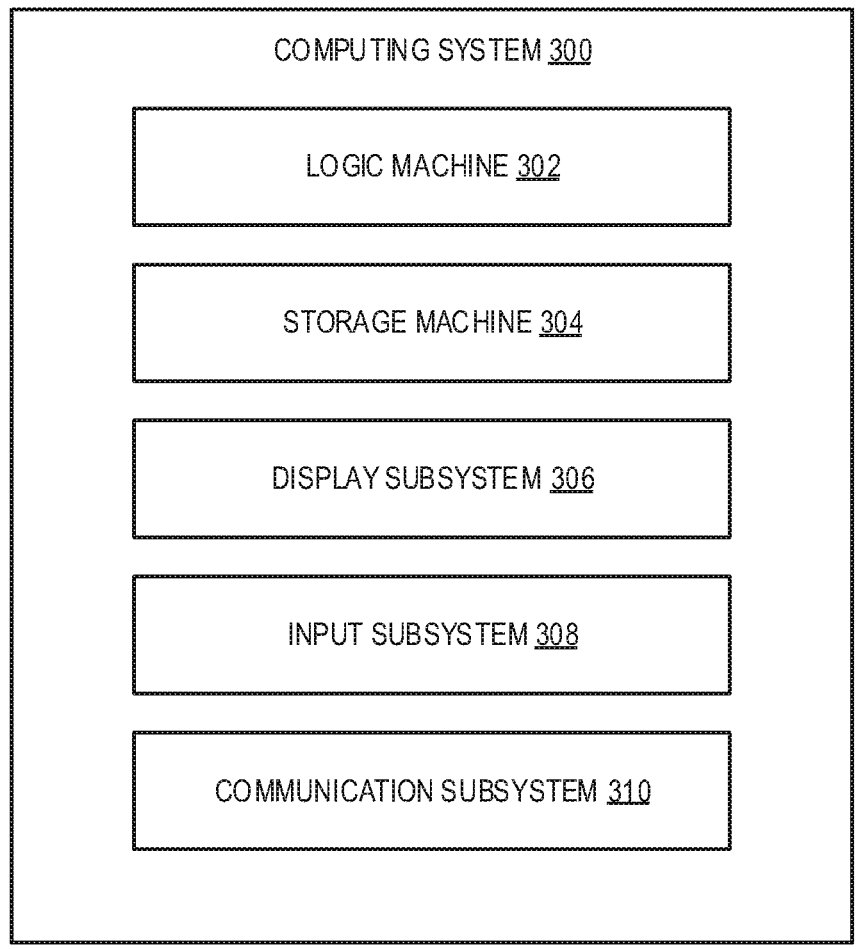
FIG. 3 presents a block diagram of an exemplary computing system.

The illustration of FIG. 3 presents a block diagram of an exemplary computing system 300. Computing system 300 may be configured to implement one or more of the approaches described herein, and may assume any suitable form (e.g., game console, microcontroller, system-on-a-chip (SOC), desktop computing device, server computing device, mobile computing device).

Computing system 300 may include a logic machine 302 configured to execute machine-readable code. Logic machine 302 may execute machine-readable code for any suitable purpose, including but not limited to performing mathematical operations, processing data, transforming data, providing output, actuating devices, changing the state of devices, and achieving a technical effect. Machine-readable code executed by logic machine 302 may be part of any suitable software or data construct, such as a micro operation set, assembly instruction set, software application, library, service, program, etc.

Logic machine 302 may be implemented in any suitable hardware. For example, logic machine 302 may be implemented in one or more microcontrollers, processors, and/or other logic machines. Logic machine 302 may be addressable via a suitable instruction set (e.g., x86, ARM, MIPS), and may include suitable firmware to control its operation. Logic machine 302 may be implemented in a single device or across two or more devices, which be configured as distributed and/or virtualized devices.

Computing device may include a storage machine 304. Storage machine 304 may store machine-readable code executable by logic machine 302 to implement the approaches described herein. In some scenarios, implementation of such approaches may result in the transformation of the state of storage machine 304. As a result of such transformation, the data stored by storage machine 304 may be transformed as well. Storage machine 304 may be implemented in one or more physical devices, including but not limited to magnetic storage devices (e.g., hard drive, floppy disk drive, tape drive), optical storage devices (e.g., CD/DVD/Blu-Ray/HD-DVD drive), and semiconductor storage devices (e.g., RAM, EEPROM). In some implementations, storage machine 304 may be at least partially integrated with logic machine 302, for example on an SOC.

Display subsystem 306 may provide graphical output (e.g., images, video) based on suitable input. For example, such input may include data stored on storage machine 304, enabling the representation of such data by display subsystem 306. Display subsystem 306 may provide graphical output in any suitable format including that of a graphical user interface (GUI), and may incorporate any suitable display technologies (e.g., LCD, OLED, SED, CRT, plasma). Display subsystem 306 may be implemented with logic machine 302 and/or storage machine 304 in a combined enclosure, such as that of remote controller 302 (FIG. 3).

Input subsystem 308 may receive suitable input that may be represented by display subsystem 306, stored on storage machine 304, used to change the state of the storage machine and/or logic machine 302, among other purposes. Input subsystem 308 may include or interface with any suitable physical input device, including but not limited to remote controller 302 (FIG. 3), a keyboard, mouse, touch-sensitive device, hover-sensitive device, optical sensor, depth sensor, acoustic sensor, accelerometer, and gyroscope.

Communication subsystem 310 may enable communication between computing system 300 and one or more other devices. Communication subsystem 310 may be implemented in wired and/or wireless communication devices and may be configured for various communication protocols—e.g., BLUETOOTH or other radio transmission, wide/local area network communication, intranet/internet communication.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. On a computing system, a method, comprising:
   receiving a two-dimensional dataset comprising two-dimensional image data of a physical scene;
   performing a three-dimensional reconstruction of the physical scene by:
      processing the two-dimensional dataset;
      reconstructing one or more depth values associated with the two-dimensional dataset;
      constructing a three-dimensional representation of the physical scene based at least on the one or more depth values;
      outputting the three-dimensional representation;
      wherein the three-dimensional representation of the physical scene is constructed based further on a result of a prior three-dimensional representation constructed by the computing system; and
      wherein the result is stored in a data store communicatively coupled to the computing system, the data store further storing one or more unknown three-dimensional objects that failed to be classified.

2. The method of claim 1, wherein performing the three-dimensional reconstruction of the physical scene includes:

acquiring one or more parameters associated with an imaging device used to capture the two-dimensional dataset; and normalizing the two-dimensional dataset based on the one or more parameters associated with the imaging device.

3. The method of claim 1, wherein performing the three-dimensional reconstruction of the physical scene includes selecting a number of computing devices of the computing system to perform the three-dimensional reconstruction based on the two-dimensional dataset.

4. The method of claim 1, wherein performing the three-dimensional reconstruction of the physical scene includes selecting a set of computing resources of the computing system to perform the three-dimensional reconstruction based on a processing load of the computing system.

5. The method of claim 1, wherein performing the three-dimensional reconstruction of the physical scene includes classifying at least one object in the two-dimensional dataset, and wherein the three-dimensional representation of the physical scene is constructed based on the at least one classified object.

6. The method of claim 5, wherein the at least one object is a dynamic object having a variable state, and wherein the three-dimensional representation of the physical scene includes the dynamic object and encodes the variable state.

7. The method of claim 1, wherein performing the three-dimensional reconstruction of the physical scene includes fusing each portion of the two-dimensional dataset that is of a threshold similarity into a respective group, and wherein the one or more depth values are reconstructed for each group as a whole.

8. The method of claim 1, wherein performing the three-dimensional reconstruction of the physical scene includes filtering the three-dimensional representation of the physical scene by identifying and discarding one or more disconnected components of the three-dimensional representation.

9. The method of claim 1, further comprising generating one or more texture files that are spatially associated with the three-dimensional representation of the physical scene, wherein the one or more texture files are generated based on the two-dimensional dataset.

10. A computing system, comprising:
one or more logic machines configured to:
receive a two-dimensional dataset comprising two-dimensional image data of a physical scene;
schedule a three-dimensional reconstruction of the physical scene to be executed by a number computing devices of the computing system, the number of computing devices selected based on the two-dimensional data set and on a processing load of the computing system;
via the selected number of computing devices,
process the two-dimensional dataset;
reconstruct one or more depth values associated with the two-dimensional dataset;
construct a three-dimensional mesh of the physical scene based at least on the one or more depth values;
output the three-dimensional mesh; and
wherein the three-dimensional representation of the physical scene is constructed based further on a result of a prior three-dimensional representation constructed by the computing system; and
wherein the result is stored in a data store communicatively coupled to the computing system, the data store further storing one or more unknown three-dimensional objects that failed to be classified.

11. The computing system of claim 10, wherein the one or more logic devices are further configured to vary the number of computing devices selected to execute the three-dimensional reconstruction of the physical scene as the processing load of the computing system changes.

12. The computing system of claim 10, wherein the one or more logic devices are further configured to select a set of computing resources with which to execute the three-dimensional reconstruction of the physical scene, the selected set of computing resources including one or more of processor cores, functional units, threads, time slices, and memory ranges.

13. The computing system of claim 10, further comprising a data store storing a result of a prior three-dimensional reconstruction, and wherein the three-dimensional mesh of the physical scene is constructed based further on the result.

14. The computing system of claim 10, wherein executing the three-dimensional reconstruction of the physical scene includes classifying at least one object in the two-dimensional dataset, and wherein the three-dimensional mesh of the physical scene is constructed based on the at least one classified object.

15. The computing system of claim 10, wherein executing the three-dimensional reconstruction of the physical scene includes fusing each portion of the two-dimensional dataset that is of a threshold similarity into a respective group, and wherein the one or more depth values are reconstructed for each group as a whole.

16. The computing system of claim 10, wherein executing the three-dimensional reconstruction of the physical scene includes filtering the three-dimensional representation of the physical scene by identifying and discarding one or more disconnected components of the three-dimensional representation.

17. A computing system, comprising:
one or more logic machines configured to:
receive a two-dimensional dataset comprising two-dimensional image data of a physical scene;
acquire one or more parameters associated with an imaging device used to capture the two-dimensional dataset;
schedule a three-dimensional reconstruction of the physical scene to be executed by a set of computing resources of the computing system, the set of computing resources selected based on the two-dimensional data set and on a processing load of the computing system;
via the selected set of computing resources,
normalize the two-dimensional dataset based on the one or more parameters associated with the imaging device;
classify at least one object in the two-dimensional dataset;
reconstruct one or more depth values associated with the two-dimensional dataset;
construct a three-dimensional mesh of the physical scene based on the one or more depth values and the at least one classified object;
output the three-dimensional mesh for display by a display device;
wherein
the at least one object is a dynamic object having a variable state, and wherein the three-dimensional mesh of the physical scene includes the dynamic object and encodes the variable state, executing the three-dimensional reconstruction of the physical scene includes fusing each portion of the two-dimensional dataset that is of a threshold similarity into a respective group, the one or more depth values are reconstructed for each group as a whole, executing the three-dimensional reconstruction of the physical scene includes filtering the three-dimensional mesh of the physical scene by identifying and discarding one or more disconnected components of the three-dimensional mesh, the one or more logic devices are further configured to, via the selected set of computing resources, generate one or more texture files that are spatially associated with the three-dimensional mesh of the physical scene, wherein the one or more texture files are generated based on the two-dimensional dataset, and the three-dimensional mesh of the physical scene is constructed based further on a result of a prior three-dimensional mesh constructed by the computing system.

* * * * *